US011397781B2

(12) United States Patent
Weddeling et al.

(10) Patent No.: US 11,397,781 B2
(45) Date of Patent: Jul. 26, 2022

(54) DATABASE SEARCH INTEGRATION (71) Applicant: SAP SE, Walldorf (DE)

(72) Inventors: Peter Weddeling, Sinsheim (DE); Baré Said, St. Leon (DE); Peter Lang, Bad Schonborn (DE); Karl Fuerst, Wiesloch (DE); Andreas Balzar, Bad Schonborn (DE); Jan Teichmann, Neustadt/Weinstrasse (DE); Tobias Hoehmann, Heidelberg (DE)

(73) Assignee: SAP SE, Walldorf (DE)

( * ) Notice: Subject to any disclaimer, the term of this patent is extended or adjusted under 35 U.S.C. 154(b) by 221 days.

(21) Appl. No.: 16/541,010

(22) Filed: Aug. 14, 2019

(65) Prior Publication Data
US 2021/0049219 A1 Feb. 18, 2021

(51) Int. Cl.
G06F 16/953 (2019.01)
G06F 16/25 (2019.01)
G06F 16/21 (2019.01)

(52) U.S. Cl.
CPC .......... G06F 16/953 (2019.01); G06F 16/212 (2019.01); G06F 16/258 (2019.01)

(58) Field of Classification Search
CPC ..... G06F 16/953; G06F 16/212; G06F 16/258
USPC ....................................................... 707/706
See application file for complete search history.

(56) References Cited

U.S. PATENT DOCUMENTS 10,929,415 B1* 2/2021 Shcherbakov ...... G06F 3/04842
11,113,294 B1* 9/2021 Bourbie ............ G06F 16/24568
11,157,497 B1* 10/2021 Batsakis ........... G06F 16/24539
2009/0106234 A1* 4/2009 Siedlecki ............... G06F 16/212
 707/999.005
2010/0070448 A1* 3/2010 Omoigui ........... H01L 27/14645
 706/55
2010/0153862 A1* 6/2010 Schreiber ........... G06Q 30/0273
 726/8
2010/0281364 A1* 11/2010 Sidman .................. G06Q 30/02
 715/713
2014/0143252 A1* 5/2014 Silverstein ............ G06F 16/248
 707/809
2014/0282910 A1* 9/2014 Palmer .................... H04L 63/10
 726/4
2015/0058314 A1* 2/2015 Leclerc ................... G06F 16/27
 707/711

(Continued)

Primary Examiner — Mark E Hershley
(74) Attorney, Agent, or Firm — Fountainhead Law Group P.C.

(57) ABSTRACT

The present disclosure pertains to systems and methods for providing search results. A database server may include both a database and a search engine. The database server can receive a search request from an application of a remote computer. The search request can include one or more search terms and permission information. The database server can determine adapting information using the permission information. The database server can provide a search call based on the search request and the adapting information to the search engine. The search engine can determine one or more search statements for the search call. The search engine can execute the one or more search statements on one or more stored search models to obtain database results reflecting the permission information. The database server can provide search results based on the database results to the application of the remote computer.

17 Claims, 9 Drawing Sheets (56) References Cited

U.S. PATENT DOCUMENTS

| | | | |
|---|---|---|---|
| 2017/0199989 A1* | 7/2017 | Lilko | G06F 21/10 |
| 2017/0329957 A1* | 11/2017 | Vepa | G06F 21/445 |
| 2017/0331832 A1* | 11/2017 | Lander | H04L 63/102 |
| 2018/0024901 A1* | 1/2018 | Tankersley | G06T 11/206 |
| | | | 707/694 |
| 2019/0320038 A1* | 10/2019 | Walsh | G06F 9/547 |

\* cited by examiner

DATABASE SEARCH INTEGRATION

CROSS REFERENCE TO RELATED APPLICATIONS

The present application is related to application Ser. No. 16/540,998 titled "Metadata Search for Remote Applications," having first-named inventor Karl Fuerst, filed Aug. 14, 2019, on the same date as the present application, which is hereby incorporated by reference in its entirety.

BACKGROUND

The present disclosure relates to computing and data processing and in particular to search integration for remote applications.

Computer software system complexity has grown tremendously to the meet expanded software functionality requirements of large organizations. This growth in complexity may result in vastly different user experiences across different software applications used by an organization. For example, search functionality can vary across different applications. For instance, one application may support certain search parameters while another application may not support those parameters. Furthermore, the methods for building a search model or an analytical query may also vary across the different applications. As such, the user's experience with one application may not translate to capability in using a different application.

SUMMARY

The present disclosure provides a computer-implemented method. The method includes receiving, at a database server a search request from an application of a remote computer. The search request including one or more search terms and permission information. The database server including a database and a search engine. The method further includes determining adapting information using the permission information. The method further includes providing a search call based on the search request and the adapting information to the search engine. The method further includes determining, by the search engine, one or more search statements for the search call. The method further includes executing, by the search engine, the one or more search statements on one or more stored search models to obtain database results. The database results reflecting the permission information. Each of the one or more stored search models includes a view of the database and one or more search configuration parameters. The method further includes providing search results based on the database results to the application of the remote computer.

Another embodiment provides a non-transitory machine-readable medium storing a program. The program is executable by at least one processing unit of a device. The program includes sets of instructions for receiving a search request from an application of a remote computer. The search request including one or more search terms and permission information. The program further includes sets of instructions for determining adapting information using the permission information. The program further includes sets of instructions for providing a search call based on the search request and the adapting information to the search engine. The program further includes sets of instructions for determining one or more search statements for the search call. The program further includes sets of instructions for executing the one or more search statements on one or more stored search models to obtain search results reflecting the permission information. Each of the one or more stored search models includes a view of the database and one or more search configuration parameters. The program further includes sets of instructions for providing the search results to the application of the remote computer.

Another embodiment provides a computer system includes one or more processors, memory, and computer program code. The code includes instructions, executable on said one or more processors, configured to receive a search request from an application of a remote computer. The search request includes one or more search terms and permission information. The code further includes instructions configured to determine adapting information using the permission information. The code further includes instructions configured to provide a search call based on the search request and the adapting information to the search engine. The code further includes instructions configured to determine one or more search statements for the search call. The code further includes instructions configured to execute the one or more search statements on one or more stored search models to obtain search results reflecting the permission information. Each of the one or more stored search models including a view of the database and one or more search configuration parameters. The code further includes instructions configured to provide the search results to the application of the remote computer.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

As mentioned above, the different software applications used by an organization may have different user experiences. For example, search functionality can vary across different applications. For instance, one application may support certain search parameters while another application may not support those parameters. The methods for building a search models and analytical query can also vary across the different applications. In addition, such methods for building search models and analytical queries may be so complex that a typical user of the search model and/or query may not be able to build one themselves.

The search methods described herein improve upon prior search solutions by providing a search experience that is harmonized across different applications such that the user experience is consistent and meets the user's expectations. In addition, a user's knowledge of how the create and use searches on one application directly translate to other applications. Furthermore, the search methods described herein still provide for different search configurations for different applications.

Such improved search functionality is provided by implementing search directly on the data in the database. That is, instead of the database information being replicated and then indexed for search operations performed by a separate search engine, as in prior search solutions, the improved search systems and methods described herein incorporate a search engine into the database server and build search models directly on the views (e.g., joined tables) of the database. One advantage of the search methods described herein is that search can be performed faster because there is no delay caused by replicating the data. Furthermore, there are no inaccuracies resulting from errors in replicating the data. In addition, search functionality and results can be harmonized across various different software applications using an integration service on the database server, as mentioned above. Using the integration service described herein is advantageous because it enables a central launchpad to provide federated search across the various applications while still implementing different search configurations and authentication schemes for the different applications.

As discussed above, it is advantageous to provide search engine that searches directly on the database and an integration service that provides harmonized search results across different applications of different software services. Database servers that provide such improved search functionality are described with respect to FIGS. 1-4 below.

Figure 1:
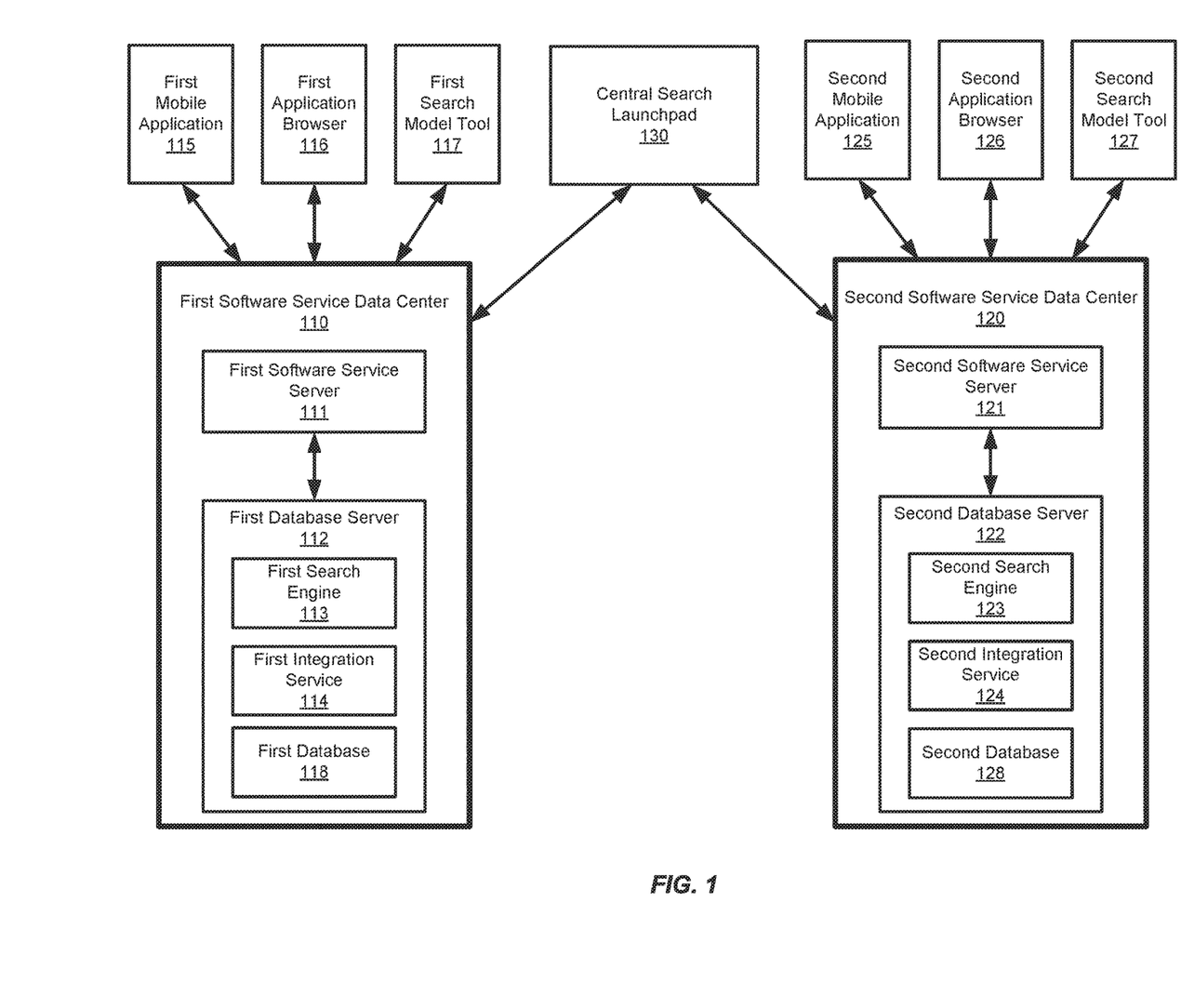
FIG. 1 shows a diagram of a system including a plurality of software service data centers and a central launchpad, according to an embodiment.

FIG. 1 shows a diagram of a system including a plurality of software service data centers 110, 120 and a central launchpad 130, according to an embodiment. The first software service data center 110 may be operated by a particular organization (e.g., a company or enterprise) and may host software services offered by a software service provider. A particular organization may operate many different data centers for applications of different software service provides. The example in FIG. 1 shows two data centers for simplicity.

The software service provider (not shown) may provide various software applications for use by the organization (e.g., enterprise resource management software, human resource management software, travel and expense management software, procurement software, workforce management software, etc.). These software applications may run on the first software service server 111. In some embodiments, the software applications may operate as cloud applications, where the end user of the application's user interface is remote from the first software service server 111 that is executing the application. For example, an end user of the software applications executed by the software service server 111 may access these software applications using an application browser 116 (e.g., web browser or software application operating on a remote computer) or a mobile application 115 (e.g., a software application for executing on a remote mobile device). In some embodiments, the first software service server 111 may comprise a plurality of server computers. As such, it may accommodate larger scale software applications.

The first software service data center 110 may also include a first database server 112. The first software service server 111 may use the first database server 112 as a database for storing application data of its various applications. The first database server 112 may include a first search engine 113. The first search engine 113 may operate directly on views or tables of a first database 118. Including the first search engine 113 in the first database server 112 provides advantages over prior systems that replicate and index data from a database to search on. For example, prior system may operate a search engine within an application server that is separate and distinct from the database server. In such prior systems, the data of the database would be replicated in the application server and search would be executed in the application server. However, replication of data requires time and computing resources and may involve errors in replication of the data, especially when the dataset is very large. By implementing the first search engine 113 on the first database server 112, the search can be executed directly on view or tables of the first database 118 without replicating the data, as is done in certain prior solutions. Therefore, searches executed by the first search engine 113 provide results faster (due to no lag in replicating data) and they are more accurate (due to less chance of errors, which can be caused by replicated).

The first database server 112 may also include a first integration service 114 that can adapt search requests to accommodate the different configurations and requirements for each of the applications provided by the various software service provides. For example, the first integration service 114 can adapt search requests to a normalized format based on the programming languages, authorization checks, tenant separation methods, user separation methods, application landscapes. In some embodiments there can be an integration service for each different application in the software service data center. The adapting of the search requests to a normalized format by first integration service is advantageous because it creates a consistent user experience when requesting searches in the various different applications. Furthermore, the normalized search format provides improved federated search across different applications using a central search launchpad 130 as further described below.

The first software service data center 110 may also communicate with a first search model tool 117, which can be used to create search models. Each search model includes a view and configuration information for searching on the first database 118. The search models can be stored on the first database server 112 for use by end users (e.g., users of the first mobile application 115 or the first application browser 116).

The second software service data center 120 may also be operated by the particular organization and it may be structured and configured similar, with some differences, to the first software service data center 110. One difference being that the second software service data center 120 is used to host applications provided by a different second software service provider (not shown), for example. Another difference may be that the applications executing on the second software service server 121 may be different from those executing on the first software service server 111. Another difference is that the applications executing on the second software service server 121 may be provided by a second different software service provider, for example. Another difference may be that the second integration service 124 may have different configuration files and parameters compared to the first integration service, for example. Another difference may be that the database structure and organization of the database on the second database server 122 may be different from that of the database on the first database server 112. In the example shown in FIG. 1 only two data centers are shown for simplicity, but there could be any number of data centers in a search system.

The search system may also include a central search launchpad 130 that provides a central search user interface for generating federated searches across applications executing on different data centers. The central launchpad can provide a harmonized search experience for the user across different applications of different software services while still achieving the different configurations and requirements of those applications. This can be achieved because the integration services of the data centers are configured to provide normalized search requests to their databases and the search results from the database are normalized such that they can be combined together (e.g., the search configurations of one application in one data center may be compatible with the search configurations of another application in another data center). As such, users of the central search launchpad 130 can provide search input to receive search results from all of the various applications in the different data centers of their organization.

Thus, the central launch pad can provide federated search across a plurality of software services having different applications. The other search models of the plurality of software services can provide the same set of configuration parameter options as the stored search models in the first database 118 such that the search results can be combined with other search results of the plurality of software services (e.g., applications executed by the second software service server 121). This is advantageous because the user does not need to be familiar with the detailed data storage structures of the various applications in order to find the information that they need.

As discussed above, the integration service and the search engine of the database server provide improved search functionality. These and other elements of the software service data center are further described below with respect to FIG. 2.

Figure 2:
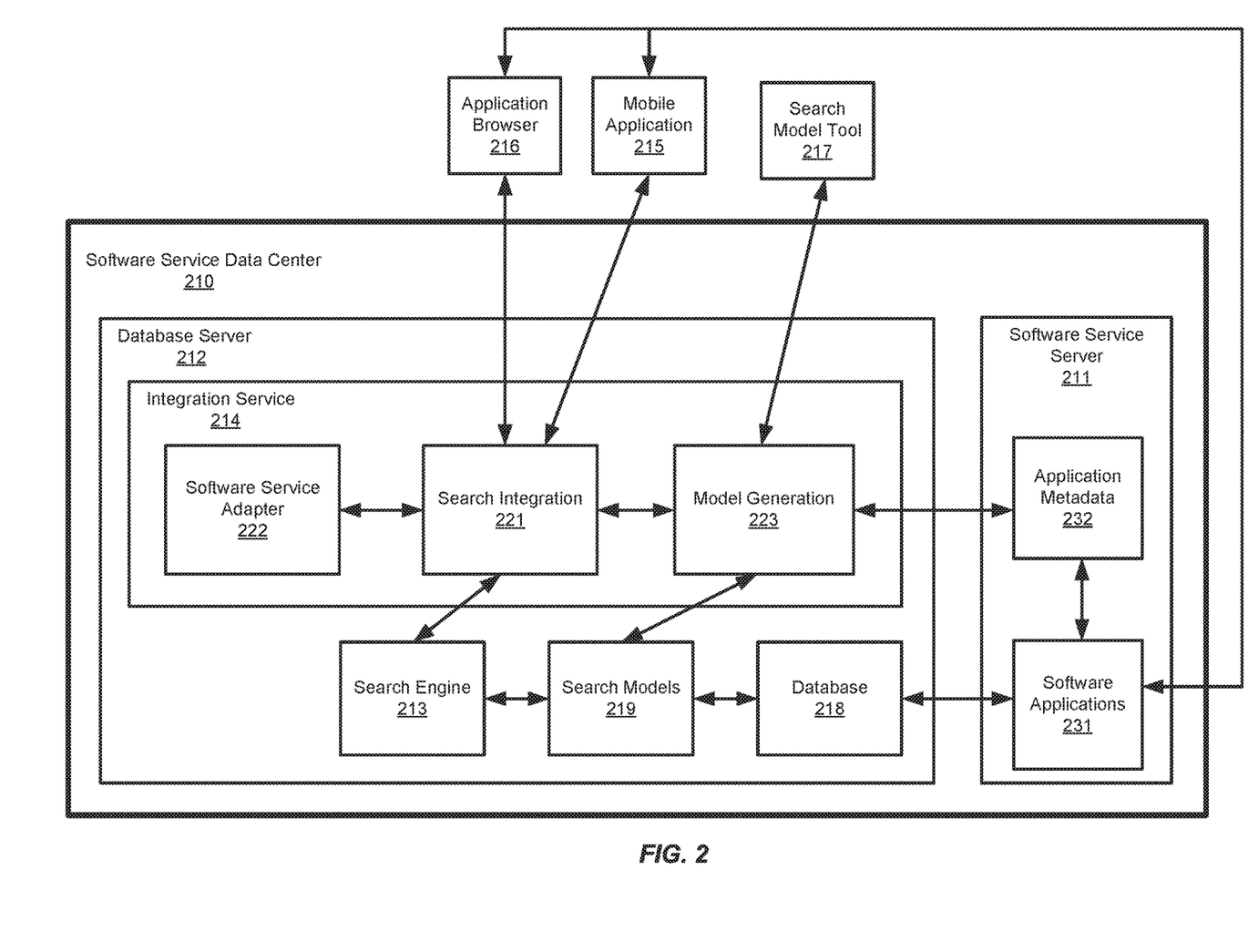
FIG. 2 shows a diagram of a software service data center for searching, according to an embodiment.

FIG. 2 shows a diagram of a software service data center 210, according to an embodiment. The software service data center 210 can be structured and configured similar to the first software service data center 110 of FIG. 1. As shown in FIG. 2, the database server 212 can include both a search engine 213 and a database 218, which enables improved search directly on the data in the database without replication of the data as described herein.

The integration service 214 of the database server 212 includes a search integration module 221, a software service adapter module, and a model generation module 222. The search integration module can receive and process search requests from the application browser 216 and the mobile application 215. The application browser 216 and the mobile application 215 may provide end user interfaces for software applications 231 executing on the software service server 211.

The search requests can include one or more search terms (e.g., terms input by an end user) and permission information (e.g., a username and/or tenant name). In some embodiments, the search request may be a representational state transfer application programming interface request. In some embodiments the search request may be received from the application via a hypertext transfer protocol.

The search integration module 221 can provide the permission information to the software service adapter module 222. For example, the permission information may be obtained from a context of the search request (e.g., an HTTP header). In some embodiments the permission information includes one or more of a username, a tenant name, an organization name, and an authorization token.

The software service adapter module 222 can process the permission information to determine configurations specific to a particular application executed by the software service server 211. For example, the software service adapter module 222 can determine a database schema associated with the tenant name and a query that filters that schema according to an authorization scope of the user determined based on the permission information. As such, the query and schema adapt the search request according to the specific requirements of the particular application associated with the schema. The software service adapter module 222 sends the database schema and the quest to the search integration module 221.

The search integration module 221 uses the schema and the query to generate search statements for making a search call to the search engine 213. The search call is modified and filtered according to the permission information. The modifications and filtering of the search call are advantageous because they maintain user permission requirements and tenant separation requirements. As such, the end user cannot not see information in the search results that they do not have permission to see.

The search can be executed on search models 219 of the database 218. Each of the search models 219 can contain a view of the database 218 and configuration parameters for the search. The search configuration parameters can include one or more of a default search indicator, a fussiness threshold, a ranking indicator, and a facet indicator.

These search models 219 may be pre-defined or they may be built using the search model tool 217. The search model tool 217 can communicate with the model generation module 223 to build search models. The model generation tool can receive application metadata 232 from the software service server 211 for use in building search models. The application metadata may indicate the format of the stored data (e.g., in the database 218) for a particular application. The user of the search model tool 217 can assign various search configuration parameters to a particular view of the database 218 to create a search model. As mentioned above, the search configuration parameters can include one or more of a default search indicator, a fussiness threshold, a ranking indicator, and a facet indicator. These search models may be stored at the database server 212 along with the other stored search models 219.

The search engine 213 can return the search results to the search integration module 221. The search results may be formatted as data objects. For example, the data objects may be formatted according to JavaScript object notation. These results can then be presented to the user that initiated the search. In some embodiments, the search integration 221 can convert the search results to hypertext transfer protocol and provide the converted search results back to the application that requested the search (e.g., Application Browser 216 or Mobile Application 215).

The functions and requirements for executing a search using the integration service and the search engine are further described below with respect to FIG. 3.

Figure 3:
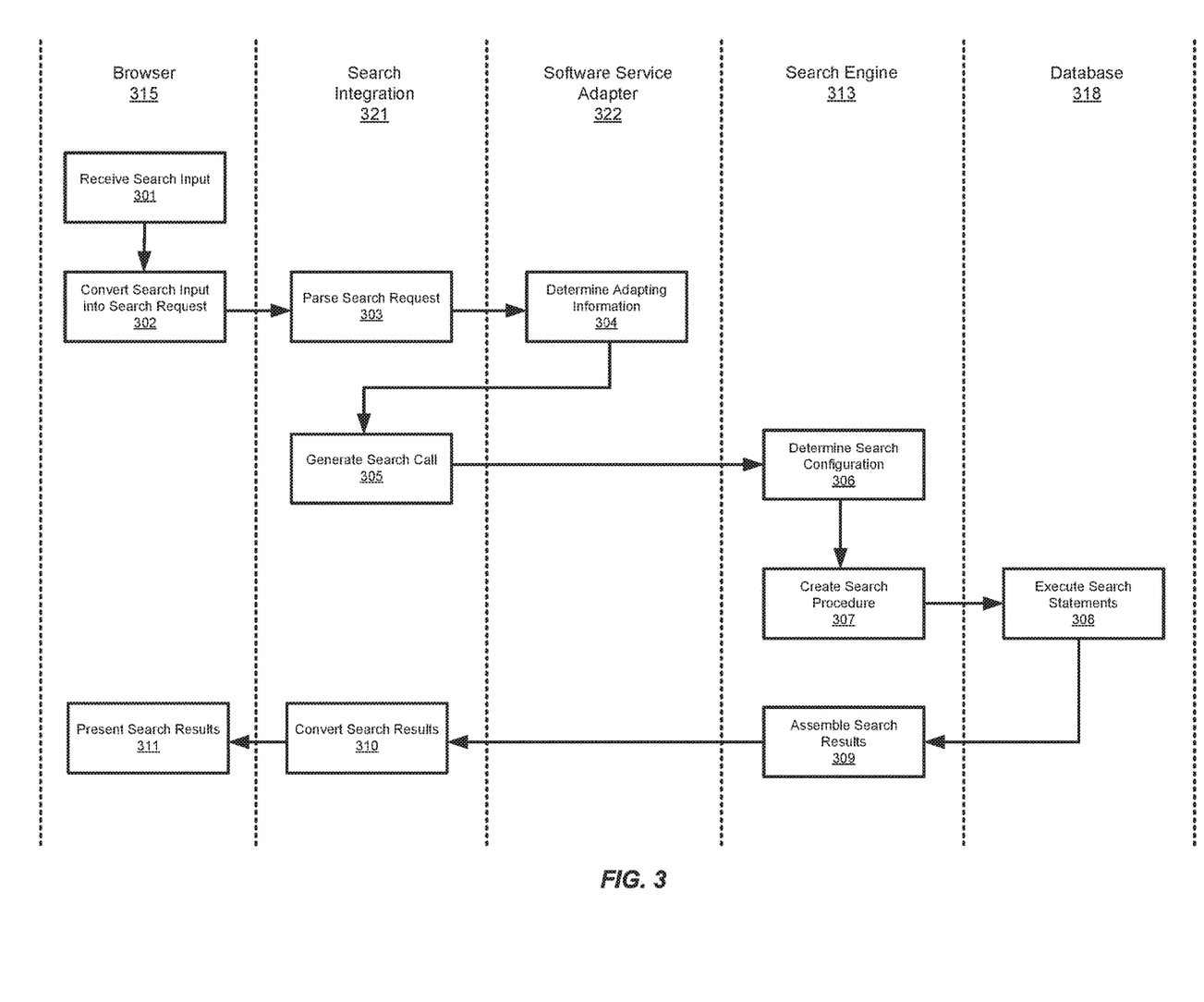
FIG. 3 shows a flowchart for executing search on a database, according to an embodiment.

FIG. 3 shows a flowchart for executing search on a database, according to an embodiment. The method for executing a search shown in FIG. 3 can be implemented on the software service data center 210 of FIG. 2, for example. The method of FIG. 3 is performed by a browser 315, a search integration module 312, a software service adapter 322, a search engine 313, and a database 318.

At 301, a browser (e.g., application browser or mobile browser) can receive search input from a user. The search input can be one or more terms input by the user. For example, the user may enter the search term "location1" to search for location1 in the database.

At 302, the browser can convert the search input into a search request. The search request can be formatted as an HTTP GET request, for example. In some embodiments the search request can be formatted using OData v4 syntax. In one example, the search request may be formatted as follows:
{host}:{port}/integrationserver/search/
$all?$count=true&$top=10&$s kip=0&$apply=filter
(Search.search(query="SCOPE: SCHEMA_SEARCH location1"))&whyfound=true As shown above, the search request includes the term "location1." The search request can be sent to a search integration module 321 of an integration service of a database server.

At 303, the search integration module 321 can parse the search request to determine the search terms and permission information associated with the search request. In some embodiments, the permission information can include one or more of a username and or a tenant name. For example, the permission information may include a username of "testuser1" and a tenant name of "testtenant1." The permission information may be determined from a header of the HTTP request, for example. The search integration 321 provides the permission information to a software service adapter 322 of the integration service.

At 304, the software service adapter 322 determines adapting information based on the permission information. The adapting information can be used to adapt the search request such that it maintains authorization and permission requirements. In some embodiments, the adapting information can include a database schema associated with the tenant name. For example, the schema "testschema1" may be associated with the tenant name. In some embodiments the adapting information can include one or more domains associated with the username and the schema. In one example, the adapting information may indicate domains wherein the domain name can be ONBOARDING or PROMOTION, as follows:
DOMAIN_NAME eq 'ONBOARDING' OR DOMAIN_NAME eq 'PROMOTION'

As shown above, the domain of ONBOARDING and PROMOTION can be included in the adapting information.

The software service adapter 322 sends the adapting information to the search integration module 321.

At 305, the search integration module 321 receives the adapting information from the software service adapter 322 and generates search calls based on the search request and the adapting information. For example, the search call can include the schema and the one or more domains if they are included in the adapting information. In one example, the search call may be as follows:

```
call sys.esh__search('
["/testschema1/$all?$count=true&$top=10&$skip=0&$apply=filter(Se
arch.search(query='SCOPE:SCHEMA__SEARCH location ') and
(DOMAIN_NAME eq 'ONBOARDING' OR DOMAIN_NAME eq
'PROMOTION')' )&whyfound=true"]',?);
```

As shown above, the search call can be based on the adapting information and include an indicator of the schema (testschema1) and indicators of the domain (e.g., domains ONBOARDING and PROMOTION).

The search call can be made to the search engine 313 of the database server. In some embodiments, the search call may be formatted according as a java database connectivity application programming interface query.

At 306, the search engine 313 receives the search call from the search integration module 321 and it determines search configuration parameters based on a search model used for the search. The search model includes a search view of the database and search configuration parameters. The search configuration parameters can include one or more of a default search indicator, a fussiness threshold, a ranking indicator, and a facet indicator, for example. In one example, a set of search configuration parameters for a column may be as follows:

```
{
    "Name": "FirstName",
    "@Search.defaultSearchElement": true,
    "@Search.fuzzinessThreshold": 0.7,
    "@Search.ranking": "HIGH"
}
```

As shown above, the FirstName column has the following search configuration parameters: it is a default search element (e.g., it is search even if it is not specifically selected for search), and it has a fuzziness threshold of 0.7, and it has a search ranking of HIGH.

At 307, the search engine 313 creates a search procedure. The search procedure can include structured query language (SQL) statements. These statements are made to the database 318.

At 308, the database executes the search statements and determines search results. In some embodiments, the database results can be formatted as data objects. In some embodiments, the search results may be formatted according to JavaScript object notation. The database 318 can send the search results to the search engine 313.

At 309, the search engine 313 assembles the search results from the database 318. In one example of searching for "carbon," one of the search results may be as follows:

```
{
    "@com.sap.vocabularies.Search.v1.Ranking": 0.9914942,
    "@com.sap.vocabularies.Search.v1.WhyFound": {
        "abstract": [
            "... regulate the uptake and storage of <b>carbon</b> within
soils of cattle pastures ..."
        ],
        "title": [
            "... root exudation and accumulation of soil
<b>carbon</b> in perennial grasslands"
        ]
```

-continued

```
},
  "@odata.context": "$metadata#awards",
  "id": 1501686,
"title": "DISSERTATION RESEARCH: Does grazing stimulate root
exudation and accumulation of soil carbon in perennial grasslands?"
}
```

As shown above, the search results include the search term of "carbon."

The search results can reflect the permission information. That is, the search results may not include information that the user making the search request does not have permission to see. In addition, the search results can enforce the tenant separation requirements of the application. The search results reflect the permission information because the search call from the search integration module 321 at 305 was adapted based on the adapting information received from the software service adapter 322.

At 310, the search engine 313 provides the search results to the search integration module 321. The search integration module 321 converts the search results into a format that can be viewed by the user of the browser 315. In some embodiments the search results are converted into HTTP such that they can be presented by the browser 315. The search integration module 321 sends the converted search results to the browser 315.

At 311, the browser presents the search results to the user of the browser 315. As discussed herein, the user's search experience is improved because the search results presented to the user are normalized by virtue of the search being adapted based on the adapting information. With the search calls being normalized across different applications, the user may get consistent results when initiating searches in the different applications. As discussed here, integration service adapts search requests to a normalized format based on the programming languages, authorization checks, tenant separation methods, user separation methods, application landscapes. In some embodiments there can be an integration service for each different application in the software service data center. The adapting of the search requests to a normalized format by first integration service is advantageous because it creates a consistent user experience when requesting searches in the various different applications. Furthermore, the normalized search format provides improved federated search across different applications using a central search launchpad as discussed above.

Figure 4:
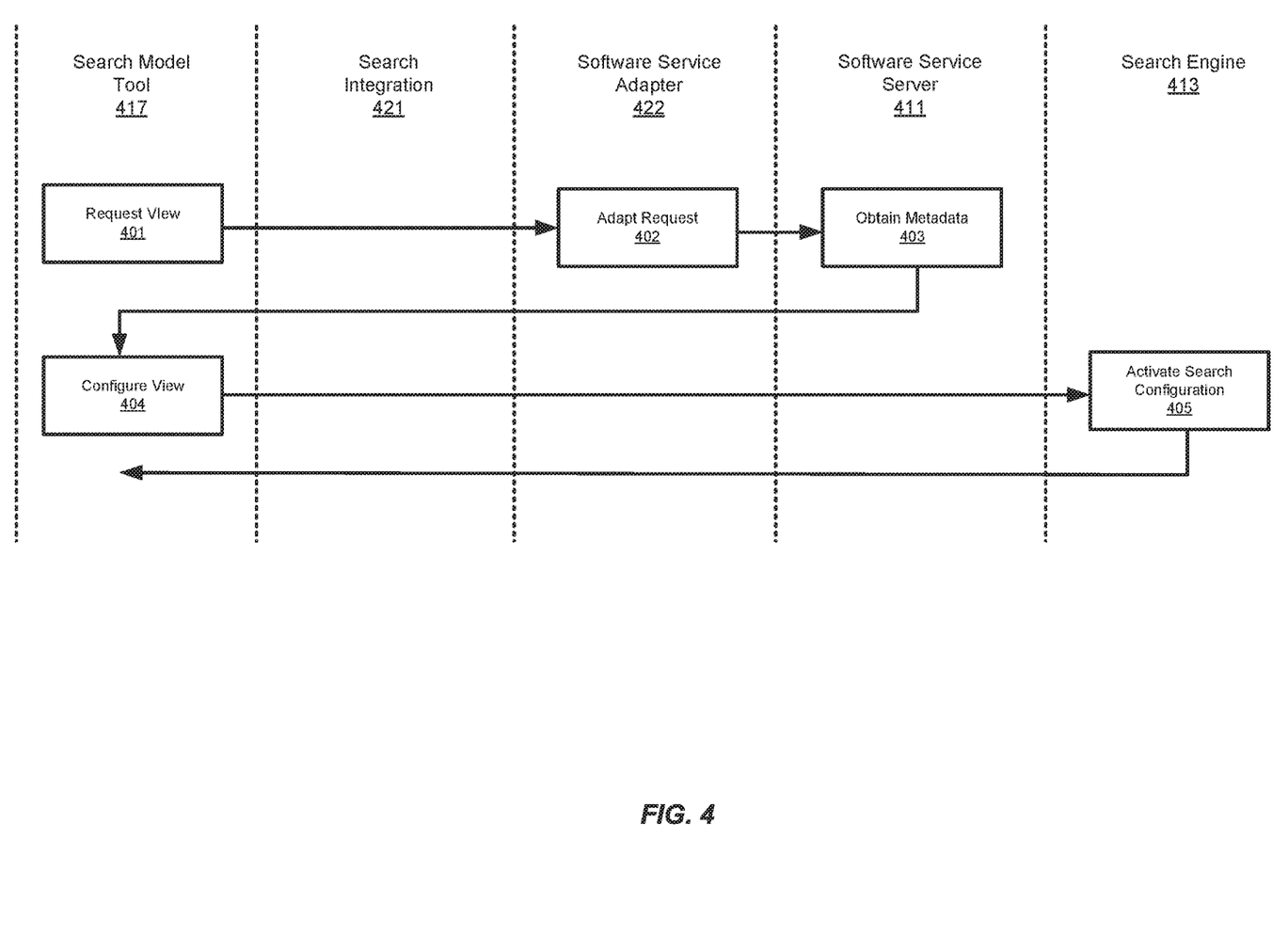
FIG. 4 shows a flow chart for generating search views and search configurations, according to an embodiment.

As discussed above, the search is based on a search model including a view and search configuration parameters. The database server can provide a model generation module that enables a remote search model tool to generate search models for a particular application provided by the software service server.

FIG. 4 shows a flow chart for generating search views and search configurations, according to an embodiments. The method shown in FIG. 3 can be implemented on the software service data center 210 of FIG. 2, for example. The method for generating search views and search configurations can be performed by a search model tool 417, a software service adapter 422, a software service server 411, and a search engine 413.

The search model tool 417 is used to create the search models (e.g., search models 219 in FIG. 2) for the database (e.g., database 218 in FIG. 2). As discussed herein, the search operates directly on the database using a view (e.g., instead of replicating data and creating an index of that data outside of the database). In order to generate the search models, application metadata (e.g., application metadata 232 shown in FIG. 2) describing the storage format of the application is received from the software service server. Each application provided by the software service server may have an associated search model (e.g., a view and configuration parameters) stored on the database. Search model generation is further described below.

At 401, the search model tool 417 requests a view of the database. The request is sent to the software service adapter 422. The request for the view may be passed by the search integration module 421.

At 402, the software service adapter 422 adapts the request. The request for the view may be adapted similar to the adapting of the search request discussed above.

At 403, the software service server 411 obtains metadata for the search model. The metadata may describe the storage format of the application is received from the software service server.

At 404, the search model tool configures the view. The search model tool can be used to set configuration parameters for the search model, as discussed above. For example, the search configuration parameters of the search model can include one or more of a default search indicator, a fussiness threshold, a ranking indicator, and a facet indicator.

At 405, the search engine 413 can activate the search configuration for use in the database along with the application. In some embodiments the search model can be stored in the database. The search model and configuration are provided to the search model tool 417. As such, the search models for use in searching the applications can be generated using the search model tool 417. In some embodiments, some of the search models can built without using the search model tool 417.

As such, a user can use the search model tool to generate search models including a view and configuration parameters, which can be used later during search.

Thus, the database server described herein can provide improved search using the search integration module and the search engine. As described above, the database server provides a search experience that is harmonized across different applications such that the user experience is consistent and meets the user's expectations. In addition, search functionality is improved by implementing search directly on the data in the database. As such, search can be performed faster because there is no delay caused by replicating the data. Furthermore, there are no inaccuracies resulting from errors in replicating the data.

Another advantage of the database server provided with the search integration module and the search engine is that it can enable search of storage metadata for building analytical queries or other views, for example. A query builder tool running on a remote computer can enable a user to build an analytical query (e.g., a database view used for analytical purposes) on top of an entity relationship model of the database storage structure of an application, which may be provided by a software service server. In one example, an analytical query can present all sales data from Japan, North American, and Europe that relate to a set of products over a certain period of time. In another example, an analytical query can present the number of people hired by an organization per month over a certain number of years. The database server enables the user of the query builder tool to easily build such queries without knowledge of the underlying storage structure. For example, the user may search for "employment start date" and use the search results to build the example query above for analytical presenting the number of people hired by an organization per month over a certain number of years.

In prior query building methods, a user may need to have expert knowledge on the storage structure of a particular application, or they may need to review thousands or hundreds of thousands of lines of metadata. Furthermore, some applications are so large that it may not be possible to load all of the metadata into a web browser-based query builder. As such, end users were often unable to build their own queries and instead needed to rely on information technology professionals to build queries for them.

The database server described herein addresses these problems in prior query building systems by enabling the user to easily search through the metadata in order to build a query.

Figure 5:
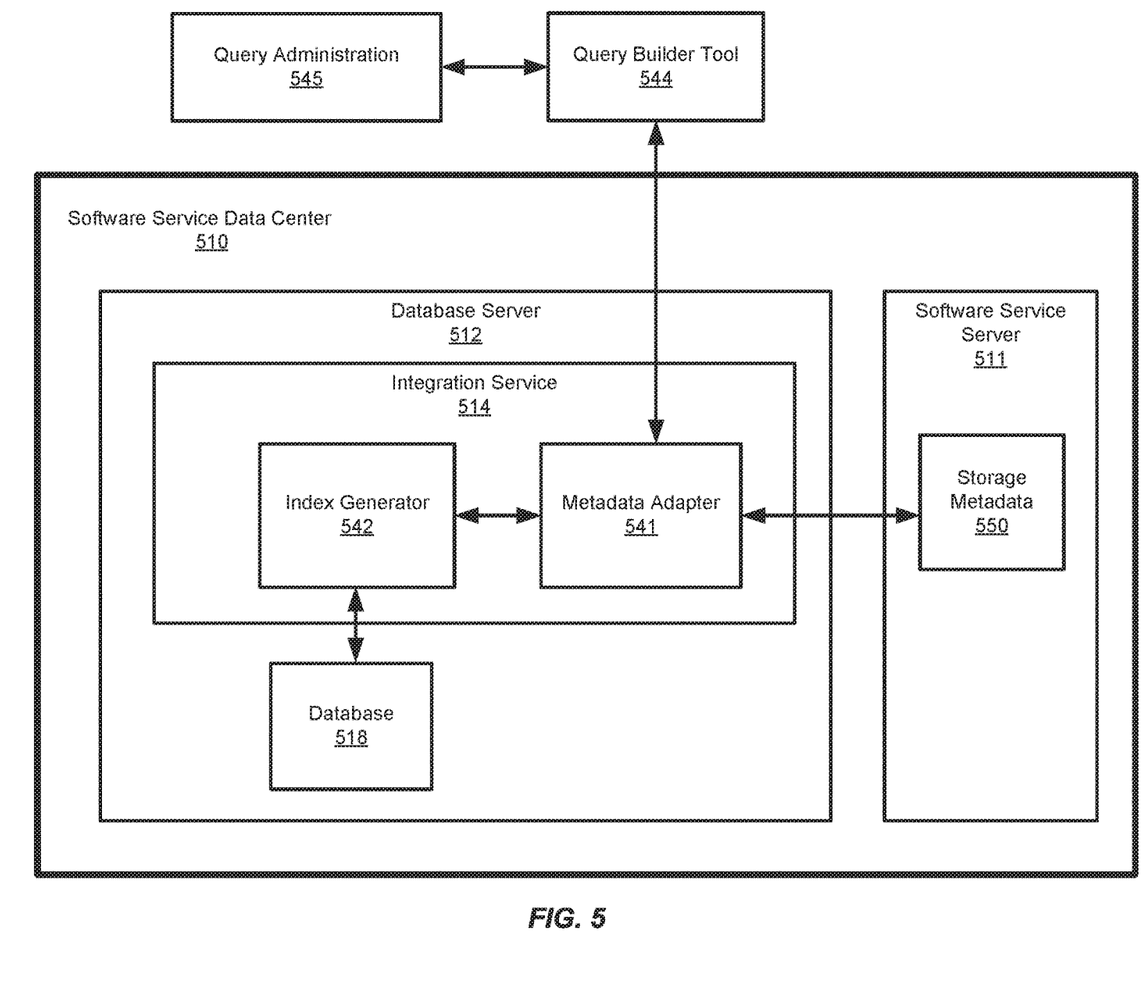
FIG. 5 shows diagram of a software service data center for generating a metadata index, according to an embodiment.

FIG. 5 shows diagram of a software service data center 510 for generating a metadata index, according to an embodiment. The software service data center 510 may be configured similar to the software service data center 210 described above with respect to FIG. 2. The database server 512 may be considered similar to the database server 212 of FIG. 2. The integration service 514 may be configured similar to the integration server 214 f FIG. 2. The database 518 may be configured similar to the database 218 of FIG. 2. And the software service server 511 may be configured similar to the software service server 511 of FIG. 2. Certain elements of the software service data center 210 of FIG. 2 are not present in FIG. 5 for clarity. The integration server 514 further includes a metadata adapter 541 and an index generator 542.

To enable searches on storage metadata, the database server requests or receives storage metadata 550 from the software service server. This metadata is converted into a searchable metadata search index and is stored on the database 518. By enabling search on the metadata search index, an end user of a query builder tool 544 can more easily build analytical queries. These queries can be stored in the query administration 545 such that the query can be called and executed later by other users.

In some embodiments, the query builder tool 544 can operate from a browser or application of a remote computer (e.g., not part of the software service data center). In some embodiments, the query builder tool 544 may be a cloud application. In some embodiments the query builder tool 544 can be configured to build queries for applications provided by one software service provider. In other embodiments the query builder tool 544 can be configured to build queries for a plurality of applications provided by different software service providers.

To build a query, the query builder tool 544 can communicate (e.g., via hypertext transfer protocol) with a metadata adapter module 541 of the database server 512. In response to the communication, the metadata adapter 541 can request and receive storage metadata 550 from the software service server 511. In some cases, the software service server 511 may have already sent the storage metadata 550 to the metadata adapter 541 and so the metadata adapter 541 may not need to request it. In some embodiments, the storage metadata 550 can be an entity relationship model indicating the storage format for a particular application provided by the software service server 511.

The metadata adapter module 541 of the integration service module 514 receives the storage metadata from the software service server 511 and converts it into an internal format. In some embodiments, the data in internal format may java objects. Here, "internal format" may mean internal to the integration service module 514. In some embodiments the "internal format" may be a normalized format that is the same across different database servers in different software service data centers.

The metadata adapter module 541 can send the converted metadata to an index generator module 542. The index generator module 542 may then convert the converted metadata into search information. As such, the metadata may be converted more than once. In some embodiments the search information can comprise insert statements to database tables. The index generator module 542 generates a searchable metadata search index based on the converted metadata. The metadata search index is stored on the database. Accordingly, the metadata search index may be searched using a search engine of the database server (e.g., the search engine 213 of FIG. 2), thereby enabling the easy creation of analytical queries. Searching of the metadata search index is further described below.

Figure 6:
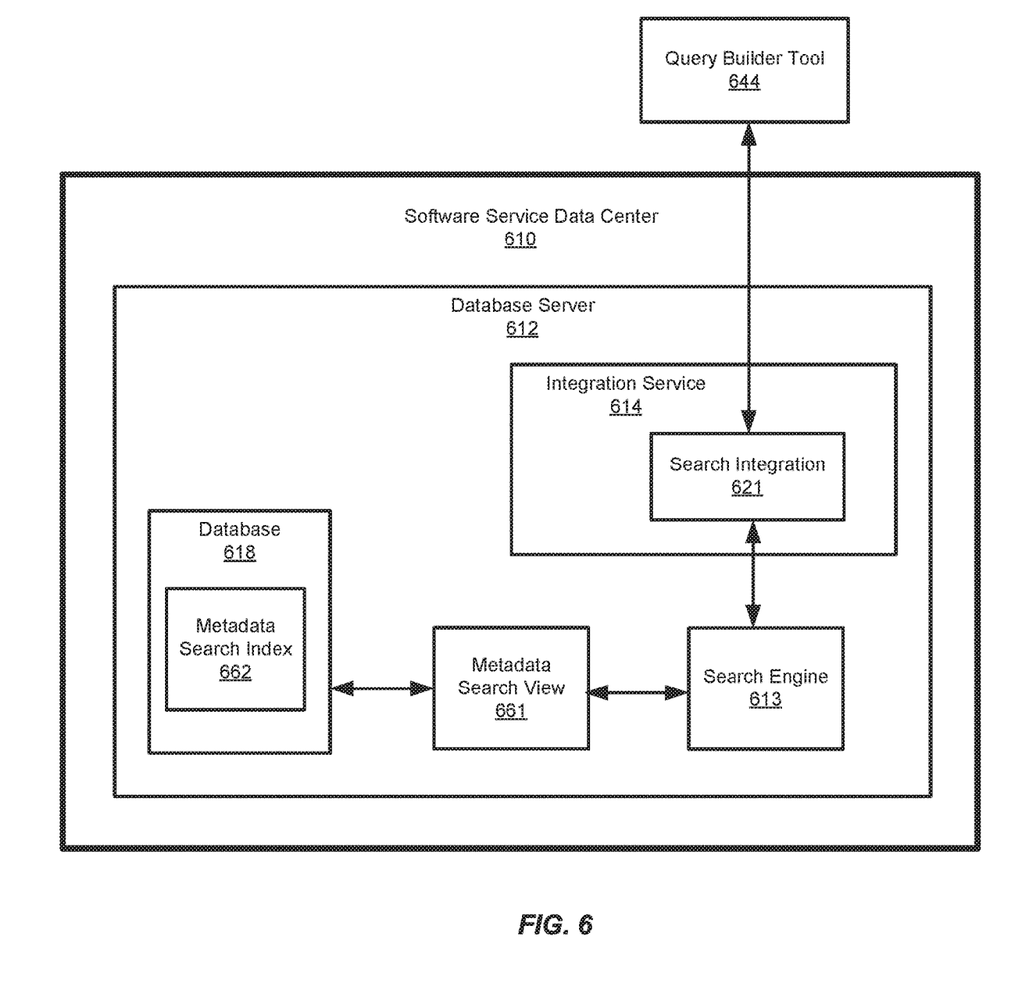
FIG. 6 shows a diagram of a software service data center for searching a metadata index, according to an embodiment.

FIG. 6 shows a diagram of a software service data center 610 for searching a metadata index, according to an embodiment. The software service data center 610 of FIG. 6 may configured similar to the software service data center 510 of FIG. 5. The search engine 613 may be configured similar to the search engine 213 of FIG. 2. As discussed above with respect to FIG. 5, a metadata search index 662 can be generated and stored in the database 618, thereby enabling a query builder tool 644 running on a remote computer to search the metadata in order to build queries. As such, the query builder tool 644 can using a search engine 613 and metadata search view 661 to search the metadata search index 662, similar to the search described with respect to FIG. 2 and FIG. 3. As discussed above, the search results can be passed back to the query builder tool 544 and be used to build a query.

As such, the metadata adapter and index generator provide improved query building functionality by enabling end users to search metadata to build queries without having knowledge of the underlying storage structure.

Example Methods

Figure 7:
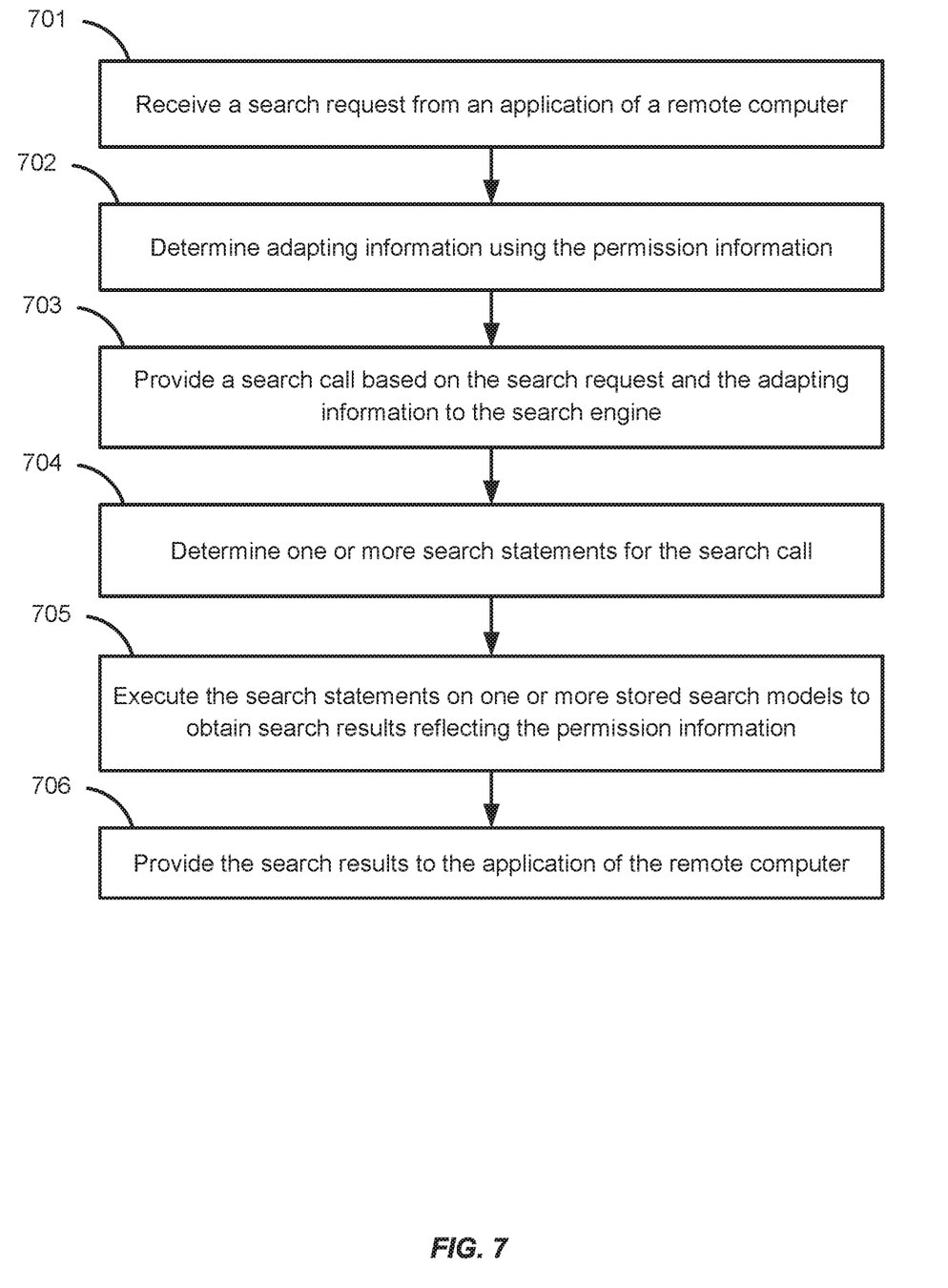
FIG. 7 shows a flow chart of a method for searching, according to an embodiment.

FIG. 7 shows a flow chart of a method for searching, according to an embodiment. The method can be implemented by a database server as described herein.

At 701, receive, at the database server, a search request from an application of a remote computer. The database server can include a database and a search engine. The search request can include one or more search terms and permission information. In some embodiments, the permission information of the search request can include one or more of a username and a tenant name. In some embodiments the search request is a representational state transfer application programming interface request. In some embodiments the search request is received from the remote application via a hypertext transfer protocol. In some embodiments the search request can be received by a search integration module as described herein.

At 702, determine adapting information using the permission information. In some embodiments the adapting information includes a database schema associated with the tenant name. In some embodiments the adapting information further includes one or more domains associated with the username. In some embodiments the determination of the adapting information can be performed by a software service adapter as described herein.

At 703, provide a search call based on the search request and the adapting information to the search engine. In some embodiments, the search call includes a schema and one or more domains. In some embodiments, the search call is a java database connectivity application programming interface query.

At 704, determine one or more search statements for the search call. In some embodiments the determination of the search statements can be performed by a search engine as described herein.

At 705, execute the one or more search statements on one or more stored search models to obtain database results. The database results can reflect the permission information. Each of the one or more stored search models can include a view of the database and one or more search configuration parameters. In some embodiments, the one or more search configuration parameters can include one or more of a default search indicator, a fussiness threshold, a ranking indicator, and a facet indicator. In some embodiments, the execution of the search statements can be performed by a search engine as described herein. In some embodiments the database results can be data objects and the method can further include converting the data objects of the database results to hypertext transfer protocol for sending to the remote application.

At 706, provide search results based on the database results to the application of the remote computer. In some embodiments, the search results are provided in JavaScript object notation.

In some embodiments, the method further includes receiving, from a search model application, a request for a view of the database. In some embodiments the method further includes obtaining metadata indicating a storage format for storing data of the application in the database of the database server. In some embodiments the metadata can be obtained from an application server for the application. In some embodiments the method further includes obtaining view configuration parameters from the search model tool. In some embodiments the method further includes generating a search model based on the view configuration parameters and the view. In some embodiments the method further includes storing the search model.

In some embodiments the application provides federated search across a plurality of software services having different applications. For example, the application can be a central search launchpad as described herein. In such embodiments, other search models of the plurality of software services may provide a same set of configuration parameter options as the stored search models such that the search results can be combined with other search results of the plurality of software services. As such, a user can search across a variety of different applications provided by different service providers and have the search results be compatible and consistent with each other.

Figure 8:
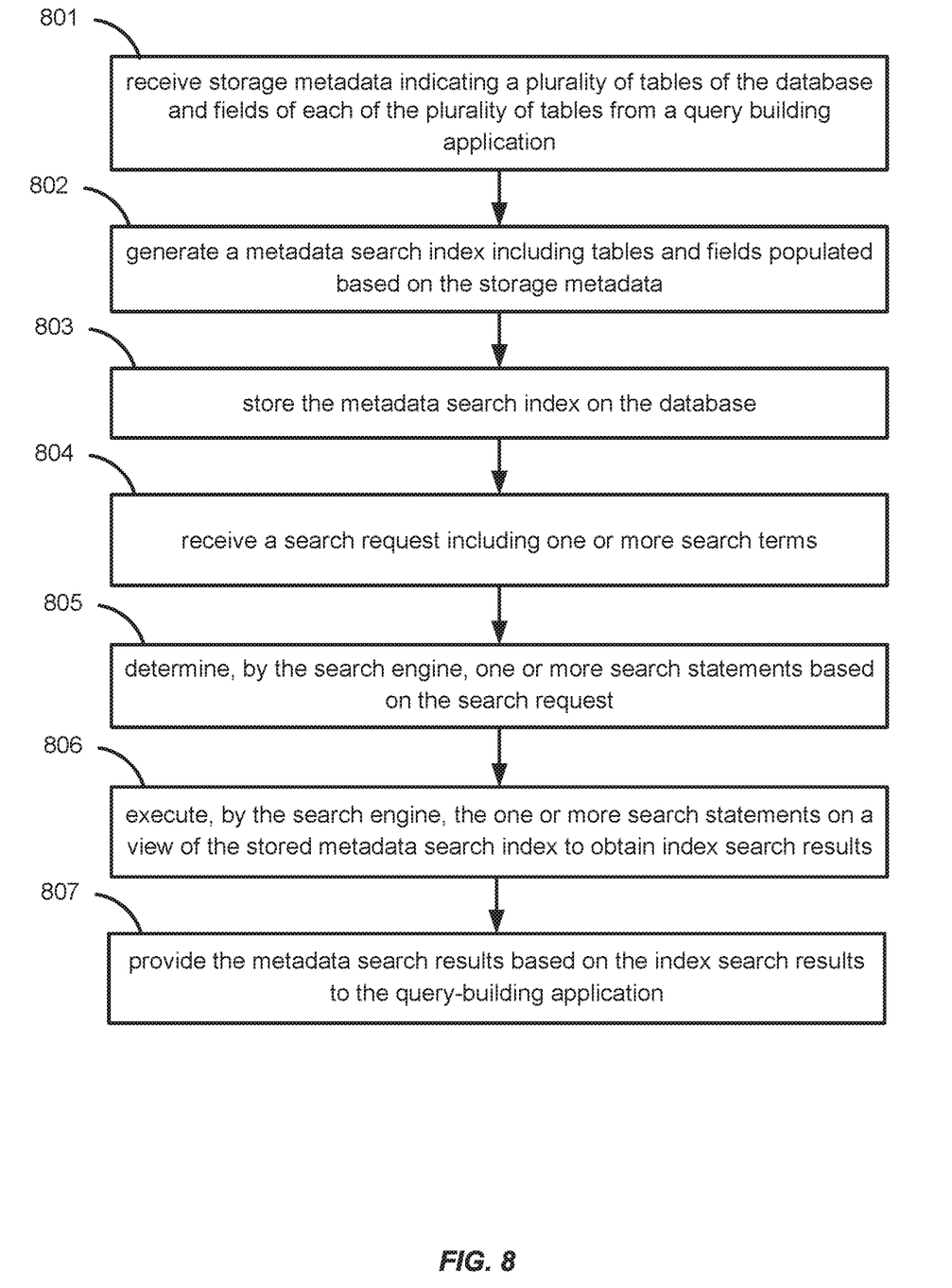
FIG. 8 shows a flow chart of a method for searching metadata, according to an embodiment.

FIG. 8 shows a flow chart of a method for searching metadata, according to an embodiment. The method can be implemented by a database server as described herein. The database server can include a database and a search engine as described herein.

At 801, receive storage metadata from a software service server. In some embodiments, the software service server uses the database of the database server to store application data. The metadata can indicate a plurality of tables of the database and fields of each of the plurality of tables. In some embodiments the storage metadata comprises an entity relationship model. In some embodiments, the method further includes parsing the entity relationship model to determine the plurality of tables and the fields of each of the plurality of tables. In such embodiments, the metadata search index can be generated based on the plurality of tables and the fields of each of the plurality of tables parsed from the entity relationship model.

In some embodiments, the method further includes converting the plurality of tables and the fields of each of the plurality of tables parsed from the entity relationship model into a normalized format.

In some embodiments, the method further includes receiving a communication from the query-building application and sending a request for the storage metadata to the software service server in response to receiving the communication.

At 802, generate a metadata search index including tables and fields populated based on the storage metadata.

At 803, store the metadata search index on the database.

At 804, receive a search request from a query-building application of a remote computer. The search request can include one or more search terms.

At 805, determine, by the search engine, one or more search statements based on the search request.

At 805, execute, by the search engine, the one or more search statements on a view of the stored metadata search index to obtain index search results.

At 806, provide the metadata search results based on the index search results to the query-building application. In some embodiments, the index search results are data objects and the method further includes converting the data objects of the index search results to hypertext transfer protocol. As such, the search results can be presented to a browser of the remote computer.

In some embodiments, the query-building application uses the metadata search results a query for querying the database. In such embodiments, the method can further include receiving a query search request based on the query.

Example Hardware

Figure 9:
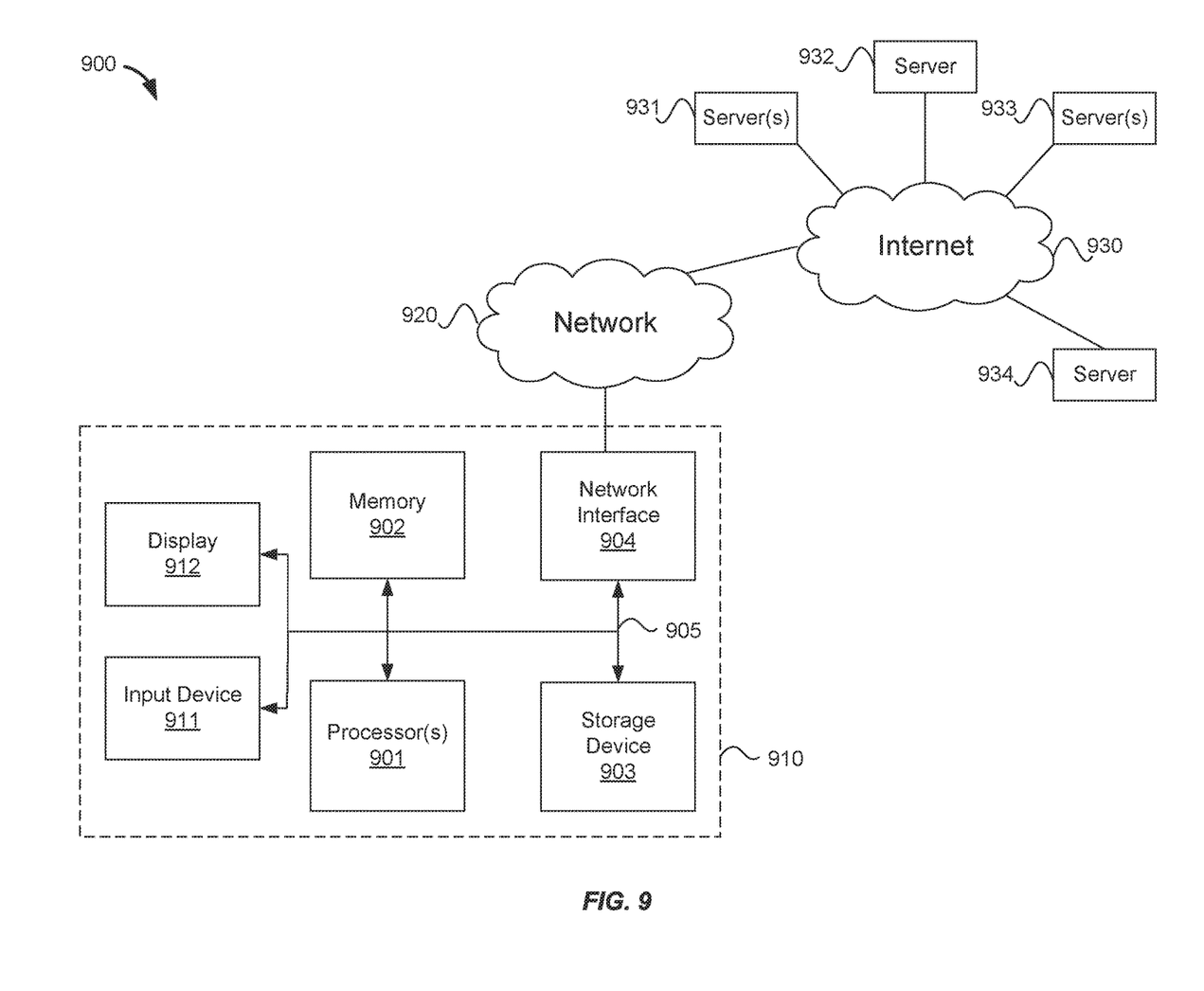
FIG. 9 shows a diagram of hardware of a special purpose computing machine for implementing systems and methods described herein.

FIG. 9 shows a diagram 900 of hardware of a special purpose computing machine for implementing systems and methods described herein.

The following hardware description is merely one example. It is to be understood that a variety of computers topologies may be used to implement the above described techniques. An example computer system 910 is illustrated in FIG. 9. Computer system 910 includes a bus 905 or other communication mechanism for communicating information, and one or more processor(s) 901 coupled with bus 905 for processing information. Computer system 910 also includes a memory 902 coupled to bus 905 for storing information and instructions to be executed by processor 901, including information and instructions for performing some of the techniques described above, for example. This memory may also be used for storing programs executed by processor(s) 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, for example. Storage device and memory are both examples of non-transitory computer readable storage mediums.

Computer system 910 may be coupled via bus 905 to a display 912 for displaying information to a computer user.

An input device 911 such as a keyboard, touchscreen, and/or mouse is coupled to bus 905 for communicating information and command selections from the user to processor 901. The combination of these components allows the user to communicate with the system. In some systems, bus 905 represents multiple specialized buses, for example.

Computer system7 also includes a network interface 904 coupled with bus 905. Network interface 904 may provide two-way data communication between computer system 910 and a network 920. The network interface 904 may be a wireless or wired connection, for example. Computer system 910 can send and receive information through the network interface 904 across a local area network, an Intranet, a cellular network, or the Internet, for example. In the Internet example, a browser, for example, may access data and features on backend systems that may reside on multiple different hardware servers 931-934 across the network. The servers 931-934 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method, comprising:
   receiving, at a database server including a database and a search engine, a search request from an application of a remote computer, the search request including one or more search terms and permission information, the permission information of the search request including a user name and a tenant name;
   determining adapting information using the permission information, the adapting information including an indicator of a database schema associated with the tenant name and indicators of one or more domains associated with the user name;
   providing a search call to the search engine, the search call adapting the search request using the adapting information to maintain permission requirements and tenant separation requirements by including a filter based on the indicator of the database schema and the indicators of the one or more domains in the search call;
   determining, by the search engine, one or more search statements for the search call;
   executing, by the search engine, the one or more search statements on one or more stored search models to obtain database results reflecting the permission information, each of the one or more stored search models including a view of the database and one or more search configuration parameters; and
   providing federated search results based on the database results to the application of the remote computer, wherein the application provides federated search across a plurality of software services having different applications, and wherein other search models of the plurality of software services provide a same set of configuration parameter options as the stored search models such that the search results can be combined with other search results of the plurality of software services.

2. The computer-implemented method of claim 1, wherein the database results are data objects, the method further comprising:
   converting the data objects of the database results to hypertext transfer protocol.

3. The computer-implemented method of claim 1, wherein the one or more search configuration parameters includes one or more of a default search indicator, a fussiness threshold, a ranking indicator, and a facet indicator.

4. The computer-implemented method of claim 1, further comprising:
   receiving, from a search model application, a request for a view of the database;
   obtaining metadata indicating a storage format for storing data of the application in the database of the database server, the metadata obtained from an application server for the application;
   obtaining view configuration parameters from a search model tool;
   generating a search model based on the view configuration parameters and the view; and
   storing the search model.

5. The computer-implemented method of claim 1, wherein the search request is a representational state transfer application programming interface request and is received from the application via a hypertext transfer protocol, wherein the search call is a java database connectivity application programming interface query, and wherein the search results are provided in JavaScript object notation.

6. The computer-implemented method of claim 1, wherein searchable data in the database is neither replicated in the application nor indexed for search operations.

7. A non-transitory machine-readable medium storing a program executable by at least one processing unit of a device, the program comprising sets of instructions for:
   receiving a search request from an application of a remote computer, the search request including one or more search terms and permission information, the permission information of the search request includes a user name and a tenant name;
   determining adapting information using the permission information, the adapting information including an indicator of a database schema associated with the tenant name and indicators of one or more domains associated with the user name;
   providing a search call to a search engine, the search call adapting the search request using the adapting information to maintain permission requirements and tenant separation requirements by including a filter based on the indicator of the database schema and the indicators of the one or more domains in the search call;
   determining one or more search statements for the search call;
   executing the one or more search statements on one or more stored search models to obtain search results reflecting the permission information, each of the one or more stored search models including a view of the database and one or more search configuration parameters; and
   providing federated search results to the application of the remote computer, wherein the application provides federated search across a plurality of software services having different applications, and wherein other search models of the plurality of software services provide a same set of configuration parameter options as the stored search models such that the search results can be combined with other search results of the plurality of software services.

8. The non-transitory machine-readable medium of claim 7, wherein the database results are data objects, wherein the program further comprises sets of instructions for:
   converting the data objects of the database results to hypertext transfer protocol.

9. The non-transitory machine-readable medium of claim 7, wherein the one or more search configuration parameters includes one or more of a default search indicator, a fussiness threshold, a ranking indicator, and a facet indicator.

10. The non-transitory machine-readable medium of claim 7, wherein the program further comprises sets of instructions for:
   receiving, from a search model application, a request for a view of the database;
   obtaining metadata indicating a storage format for storing data of the application in the database of a database server, the metadata obtained from an application server for the application;
   obtaining view configuration parameters from a search model tool;
   generating a search model based on the view configuration parameters and the view; and
   storing the search model.

11. The non-transitory machine-readable medium of claim 7, wherein the search request is a representational state transfer application programming interface request and is received from the application via a hypertext transfer protocol, wherein the search call is a java database connectivity application programming interface query, and wherein the search results are provided in JavaScript object notation.

12. The non-transitory machine-readable medium of claim 7, wherein searchable data in the database is neither replicated in the application nor indexed for search operations.

13. A computer system, comprising:
   one or more processors;
   memory; and
   computer program code comprising instructions, executable on said one or more processors, the computer program code configured to:
   receive a search request from an application of a remote computer, the search request including one or more search terms and permission information, the permission information of the search request includes a user name and a tenant name;
   determine adapting information using the permission information, the adapting information including an indicator of a database schema associated with the tenant name and indicators of one or more domains associated with the user name;
   provide a search call to a search engine, the search call adapting the search request using the adapting information to maintain permission requirements and tenant separation requirements by including a filter based on the indicator of the database schema and the indicators of the one or more domains in the search call;
   determine one or more search statements for the search call;
   execute the one or more search statements on one or more stored search models to obtain search results reflecting the permission information, each of the one or more stored search models including a view of the database and one or more search configuration parameters; and
   provide federated search results to the application of the remote computer, wherein the application provides federated search across a plurality of software services having different applications, and wherein other search models of the plurality of software services provide a same set of configuration parameter options as the stored search models such that the search results can be combined with other search results of the plurality of software services.

14. The computer system of claim 13, wherein the database results are data objects, wherein the program further comprises sets of instructions for:
   converting the data objects of the database results to hypertext transfer protocol.

15. The computer system of claim 13, wherein the one or more search configuration parameters includes one or more of a default search indicator, a fussiness threshold, a ranking indicator, and a facet indicator.

16. The computer system of claim 13, wherein the search request is a representational state transfer application programming interface request and is received from the application via a hypertext transfer protocol, wherein the search call is a java database connectivity application programming interface query, and wherein the search results are provided in JavaScript object notation.

17. The computer system of claim 13, wherein searchable data in the database is neither replicated in the application nor indexed for search operations.

* * * * *